United States Patent [19]
Lert, Jr. et al.

[11] 4,230,990
[45] Oct. 28, 1980

[54] BROADCAST PROGRAM IDENTIFICATION METHOD AND SYSTEM

[76] Inventors: John G. Lert, Jr.; Peter W. Lert, both of 9549 La Jolla Shores Dr., La Jolla, Calif. 92037; John F. Cornelius, 1828 Dora Dr., Cardiff by the Sea, Calif. 92007

[21] Appl. No.: 21,567

[22] Filed: Mar. 16, 1979

[51] Int. Cl.² .................. H04B 1/00; H04B 1/06; H04N 7/00; G06K 9/00
[52] U.S. Cl. .................... 455/67; 358/84; 358/142; 340/146.3 Z; 455/2
[58] Field of Search ............... 358/84, 86, 142, 146, 358/114, 122, 123; 325/31, 51, 53, 54, 64, 308, 311; 343/200; 364/406; 179/15 A, 15 B; 340/146.3, 146.3 Q, 146.3 SQ, 146.3 Z, 146.3 AQ

[56] References Cited

U.S. PATENT DOCUMENTS

| | | | |
|---|---|---|---|
| 3,143,705 | 8/1964 | Currey et al. | 325/31 |
| 3,148,245 | 9/1964 | Currey et al. | 325/31 |
| 3,760,275 | 9/1973 | Ohsawa et al. | 325/31 |
| 3,845,391 | 10/1974 | Crosby | 325/64 |
| 3,919,479 | 11/1975 | Moon et al. | 179/15 B |
| 4,025,851 | 5/1977 | Haselwood et al. | 325/31 |

FOREIGN PATENT DOCUMENTS

1429289  3/1976  United Kingdom ............ 455/604

OTHER PUBLICATIONS

G. Auerbach, "Pattern Recognition System for Monitoring Video and Audio Signals," Journal of the SMPTE/3-75, vol. 84.

J. C. Fletcher, "Teleproof 2: The Technology", Journal of the SMPTE/3-75, vol. 84, pp. 155-159.

Jim McDermott, "Electronics Helps Advertisers Keep Track of their TV Ads", *Electronic Design*, 3-27-71, pp. 26-28.

*Primary Examiner*—Robert L. Griffin
*Assistant Examiner*—Edward L. Coles
*Attorney, Agent, or Firm*—Walter M. Dotts, Jr.

[57] ABSTRACT

An automated method and system for identifying broadcast programs wherein a pattern recognition process is combined with a signalling event which acts as a trigger signal. At least one such trigger, or "cue" signal, occurs with each broadcast of every program which is to be identified; and these signals are used to activate the pattern recognition process which results in program identification. These cue signals can either be artificially inserted into the program signal or they can be events which occur naturally as part of normal broadcast procedures. A segment of each program at a predetermined location with respect to one of these cue signals is sampled and processed according to a feature extraction algorithm to form the program's reference signature, which is stored in computer memory. In the field, the monitoring equipment detects cue signals broadcast by a monitored station and, upon detection, samples the broadcast program signal at the same predetermined location with respect to the detected cue and uses the same feature extraction process to create a broadcast signature of unknown program identity. By comparing broadcast signatures to reference signatures, a computer identifies the broadcasts of programs whose reference signatures have been stored in memory.

67 Claims, 8 Drawing Figures

BROADCAST MONITORING SYSTEM

BROADCAST MONITORING SYSTEM

FIELD MONITOR

FIG. 3  VIDEO CUE DETECTOR

PROGRAM-CHANGE DETECTOR

AUDIO CUE INSERTER

BROADCAST PROGRAM IDENTIFICATION METHOD AND SYSTEM

BACKGROUND OF THE INVENTION

1. Field of the Invention

This invention relates generally to methods for automatically identifying broadcast programs, and more particularly to a practical and economical method of using computerized pattern recognition to identify large numbers of programs, such as commercial advertisements, broadcast by television and radio stations.

The term "program" is used herein in a generic sense to include any complete programming entity such as a news or entertainment show, a commercial, a record, etc. Hundreds of thousands of such programs are broadcast each day by commercial television and radio stations. There are many needs for information relating to this broadcasting activity that can only be satisfied by some form of direct monitoring of the broadcasts themselves.

For example, advertisers need information that would verify the broadcasts of their commercials. Advertising agencies, advertisers, and broadcasters need information relating to the scope, volume, and timing of broadcasts of commercials. Performing artists need data relating to payments of residuals and royalties. Program suppliers need verification of broadcaster compliance with provisions of contrasts for purchases of program rights. Record companies need information relating to the amount of air-play of records. And networks need information concerning broadcasts (or "clearances") by affiliated stations of network programming.

These needs have never been fully nor economically met by manual monitoring efforts. Moreover, the automated systems that heretofore have been developed have either failed to perform reliably and economically, have caused unacceptable degradation of the program quality, or have resulted in inefficient use of limited spectrum space.

2. Description of the Prior Art

There have been two general methods used in developing these automatic program identification systems in the prior art: identification encoding, and pattern recognition.

Method A: Identification Encoding

Method A includes program identification systems that require the transmission of some type of ancillary signal that contains coded information which uniquely identifies the coded program. For such a system to be acceptable to both the industry and the Federal Communications Commission (FCC), it must satisfy two fundamental requirements: (1) the ancillary signal must not cause any degradation in the program quality, and (2) the system must be extremely reliable. In addition, in order to maximize the public benefit of the scarce and valuable resource represented by available information capacity within the broadcast signal, the FCC will require that the ancillary signal occupy the absolute minimum amount of spectrum space necessary to provide the program identification service.

In order to monitor the broadcasts of television commercials, which are distributed on both film and videotape, the ancillary signal must be multiplexed with the actual program signal so as to be compatible with both recording media. To avoid program degradation, the ancillary signal must be totally imperceptible to the human audience. Such signals are referred to as "subliminal" signals. Attempts to develop subliminal identification coding have failed to satisfy the two the fundamental requirements of program non-degradation and reliability.

One such attempt, developed by International Digisonics Corporation of Chicago, Ill. and described in the *Journal of the Society of Motion Picture and Television Engineers (SMPTE)*, vol. 84, number 3, p. 160 (March, 1975), used a digital code, in the form of vertical bar (or "picket fence") patterns, which was time-multiplexed with the program video signal. Code patterns were inserted into the four corners of the rectangular picture raster, where they were to be hidden from view on home television sets by the rounded corners of the mask in front of the screen. However, it was found that some film playback equipment used by broadcasters allowed frames to shift laterally to such an extent that the vertical bars drifted into the visible picture area, causing significant degradation in program quality as well as loss of coded information and system error.

Another attempted invention of a system compatible with both film and tape was by Audicom Corporation of New York, N.Y. (U.S. Pat. No. 3,845,391; Crosby). This approach involved a digital code frequency-multiplexed with the program audio signal; the coding method was frequency shift keying. Audio encoding has the additional advantage of being compatible with both television and radio broadcasting. In order to avoid program degradation, the ancillary signal was to be submerged at a sufficiently low level to be inaudible to the listener.

However, in tests conducted by a working group of the SMPTE and reported in the final report of the Ad Hoc Committe on Television Broadcast Ancillary Signals of the Joint Committee on Intersociety Coordination (published May, 1978), this system failed to satisfy either one of the two fundamental requirements. Program identification was found to be extremely unreliable, apparently because the ancillary signal was submerged at such a low level that the noise added in transmission through the broadcasting system pushed the noise-to-signal ratio beyond the tolerances of the decoding equipment. Even at this low level, however, the ancillary signal resulted in significant degradation of program signal quality. Listener tests revealed that some of the codes were audible, while others caused noticeable distortion of the program audio. A significant factor in this degradation appears to be the duration of the encoding: approximately 3 seconds were required to transmit a uniquely identifying digital code, which is quite a long time to the human ear.

If a system is intended only to monitor broadcasts of network programs, compatibility with film and tape is not necessary since videotape is the only medium used to record programs for delayed broadcast. In this case, the ancillary signal could be contained in a part of the vertical blanking interval where it would not cause any imaging on a viewer's screen, thereby avoiding any problem of degradation of picture quality. This is the approach used in a system developed by the A. C. Nielsen Company of Northbrook, Ill. for network clearance monitoring (U.S. Pat. No. 4,025,851; Haselwood et al), wherein digital coding is placed onto line 20 in the vertical blanking interval.

If reliable, this approach would satisfy the two fundamental requirements. However, line 20 is the only line in the vertical blanking interval approved by the FCC for carrying radiated ancillary signals which has not yet been reserved for some other purpose, and it is not clear that additional lines will become available in the future. The Nielsen system would thus pre-empt valuable spectrum space that could be used for other purposes that would provide much broader public benefit. This raises the crucial public-interest issue of whether the same program-identification service could be provided with more efficient use of spectrum space.

In all of these examples, the time duration of the program identification encoding proved to be problematical in some way. Indeed, a fundamental problem of Method A is that the extent of the time domain that must be used to communicate sufficient information to identify each program uniquely turns out to be quite significant, resulting in a high probability of program degradation or in use of scarce spectrum space to valuable to devote to this purpose.

Another potential problem of a monitoring system using ancillary identification encoding is that it would be possible for a dishonest broadcaster to gain financially by counterfeiting such codes. For example, the broadcaster might sell the same commercial spot to both a national advertiser, who encodes commercials, and to a local advertiser who does not encode. By inserting the identification code from the national commercial into the broadcast of the local commercial, the broadcaster would cause the monitoring system to identify the broadcast program incorrectly and could could bill for both commercials, thereby defrauding the national advertiser. Or, if the station is a network affiliate, the broadcaster might "clip", or pre-empt, a network commercial or even a portion of a network program in order to broadcast a local commercial; but by counterfeiting the network code, he could cause the monitoring system to confirm correct clearance of the network signal.

There is another technology that can be used to identify programs without the use of identification encoding. This approach is used by the present invention. Further background discussion is therefore necessary to show how this second method in the prior art set the stage for the present invention.

Method B: Computerized Pattern Recognition

As an alternative to adding codes to the program material, the prior art includes a method of program identification whereby the audio or video program signal is analyzed in such a way that the program supplies its own unique code. Method B, therefore includes all attempts to solve the problem of automated broadcast monitoring solely through the use of computerized pattern recognition.

Pattern recognition consists of two basic processes: feature extraction and classification. The feature extraction process is applied to the program signal to produce a digital signature of a given program: certain features of the program signal are measured, and these measured values are used to characterize that program. The analog program signal is normally digitized by being passed through an analog-to-digital converter, and program information (either audio or video) is sampled and processed using some non-linear transform (which can be done either digitally or in analog) to produce a digital data set which is essentially unique to a particular program. Such a data set is commonly referred to as a "signature", "feature set", or "feature vector", terms which are to be considered as equivalent and are used interchangeably in this application.

From each program which is to be identified when broadcast, a segment of some duration is selected and used in the feature extraction process to produce the program's "reference" signature. In the field, program information from the broadcast signal of a monitored station can be sampled for a like duration and used in the same feature extraction process to form a "broadcast" signature of unknown program identity. In the classification process, broadcast signatures are compared mathematically to reference signatures in order to identify the occurence of known programs. When a broadcast signature is sufficiently similar to a reference signature, the broadcast program is identified as the know program.

The fundamental problem with a pure pattern recognition approach is the massive amount of data processing that is required. Program information in the broadcast signal must be sampled continuously, and each sample processed according to the feature extraction algorithm to form a broadcast signature. In the classification process, each broadcast signature must then be compared iteratively with reference signatures either until there is a match and a positive identification, or until the set of reference signatures is exhausted and the broadcast program is classified as unidentifiable. Since only a tiny fraction of sampled broadcast signatures will match a reference signature, the computer is therefore required to cycle through the entire library of reference signatures for virtually every sampled broadcast signature. Furthermore, there are far too many broadcast signatures to store at the monitoring site and transmit to a central computer for later classification on an economical basis. Consequently, both feature extraction and classification processing must take place concurrently. Thus, a sampled broadcast signature must be compared to each and every reference signature before the next sample broadcast signature is formed.

The magnitude of this task depends primarily upon the number of reference feature signatures in the library, plus the rate at which sample broadcast signatures are formed and the amount of data in a signature. In actual commercial practice, the set of reference signatures will represent thousands of commercials and other programs. Moreover, the minimum sampling rate and signature size that will be required for unambiguous classification will be significant regardless of the particular feature extraction and classification algorithms used. As a result, the data processing task is enormous. The computer resources that must be dedicated to monitoring each station makes this approach economically impractical.

Consider, for example, the teaching of U.S. Pat. No. 3,919,479 (Moon et al) that resulted in the Identimatch System (Real Time Technology of Norwood, Mass.). In this system, program audio was used to form program signatures. The feature extraction process consisted of an analog non-linear transform, such as full-wave rectification and low-pass filtering applied to the audio signal to produce a low-frequency "envelope" waveform, and analog-to-digital conversion of this transformed waveform. Correlation was the mathematical method of comparison used in classification. Program information from an eight-second segment of each commercial's sound track was used to form the reference signature, and the sampling rate was quite low, on the order of 50 Hz. Each signature thus consisted of around 400 numbers.

The audio program signal of each monitored station was processed using the same non-linear transform, and this broadcast envelope waveform was sampled at the same 50 Hz rate to form broadcast signatures of unknown program identity. Each fiftieth of a second, this process produced a broadcast signature derived from the preceding 8.0 seconds and consisting of 400 numbers; and each such signature had to be correlated with the entire library of reference signatures before the next signature was formed, i.e., in 0.02 second. If this library were to consist of 2,000 reference feature sets, for example, there would be 100,000 correlations for each second of the broadcast day. This would require a large computer simply to monitor a single station. For this reason, the system was not at all economical.

Another company named Video Image Analysis Corporation (VIAC) of New York developed a prototype for a pattern recognition monitoring system, described in general terms in *Journal of the SMPTE* vol. 84, number 3, p. 162 (March, 1975). In this system, video program information was used to form program signatures, though we do not know the specific feature extraction or classification algorithms used. It is known, however, that a broadcast signature was formed from each broadcast frame. Signatures were thus created at a rate of 30 per second, so the processing task would have been similar to Identimatch. It is also known that this system was abandoned after the prototype stage because it became apparent that the computational requirements would be too great for the system to be practical or economical.

In neither one of these two inventions, nor anywhere else in the prior art, is there any teaching that offers a solution to this practical problem of making the computational task cost-effective by somehow reducing the amount of data processing required to identify broadcast programs. The present invention solves this and other problems and thereby makes the method of computerized pattern recognition technically feasible and economically viable for the first time.

Examples of relevant broadcast monitoring systems using ancillary digital encoding (Method A) found in the prior art are U.S. Pat. Nos. 3,845,391; 4,025,851; 3,760,275; and a system described in the *Journal of the SMPTE,* volume 84, number 3, page 160 (March, 1975). Examples of systems using pattern recognitions techniques (Method B) found in the prior art are U.S. Pat. No. 3,919,479 and a system described in the *Journal of the SMPTE,* volume 84, number 3, page 162.

SUMMARY OF THE INVENTION

Accordingly, one object of the present invention is to provide a novel automatic broadcast monitoring system and method with improved economy.

An additional object is to provide an automatic broadcast monitoring system and method that minimizes the amount of data processing required.

A further object is to provide an automatic broadcast monitoring system and method that requires simpler and less expensive data processing equipment.

Another object is to provide a novel automatic broadcast monitoring system and method that does not require the addition of program identification codes to broadcast signals.

Still another object is to provide a system and method for automatically monitoring both television and radio broadcasts.

Yet another object is to provide an automatic broadcast monitoring system and method that can identify programs recorded on any medium, including film, videotape, audiotape, and discs.

An additional object is to provide a system and method for automatic broadcast monitoring that is immune to deception by counterfeit program identification codes.

One further object of the present invention is to provide a subliminal ancillary audio signal for use in an automated broadcast monitoring system.

These and other objects are achieved by the present automated broadcast monitoring method and system wherein a pattern recognition process is combined with a signalling event which acts as a trigger signal. At least one such trigger, or "cue" signal, occurs with each broadcast of every program which is to be identified; and these signals are used to activate the pattern recognition process which results in program identification. (The terms "cue" and "trigger" are used interchangeably in this application.) These cue signals can either be artificially inserted into the program signal or they can be events which occur naturally as part of normal broadcast procedures. A segment of each program at a predetermined location with respect to one of these cue signals is sampled and processed according to a feature extraction algorithm to form the program's reference signature, which is stored in in computer memory. In the field, the monitoring equipment detects cue signals broadcast by a monitored station and, upon detection, samples the broadcast program signal at the same predetermined location with respect to the detected cue and uses the same feature extraction process to create a broadcast signature of unknown program identity. By comparing broadcast signatures to reference signatures, a computer identifies the broadcasts of programs whose reference signatures have been stored in memory.

Compared with prior art approaches (Method B) involving continuous pattern recognition processing, the use of the cue signals represents a significant improvement in a number of ways.

First, and most importantly, the cue signals differentiate program segments from which reference signatures have been derived from all or most of the remaining program information in the broadcast signal. It is therefore unnecessary to form a program signature unless and until a cue signal is detected. Feature extraction processing is selective rather than continuous, so that all or most of the unidentifiable broadcast signatures are never created. This represents an enormous reduction in the amount of data processing required, and, therefore, in computational costs.

Secondly, cue signals provide for accurate registration in sampling. By using cue signals as synchronizing points of reference in the time domain, the feature extraction process always uses the same program information from a given program to form its signature. This further reduces the amount of broadcast program information that must be used in pattern recognition processing.

Thirdly, the cue signals eliminate the need for concurrent feature extraction and classification processing. Since broadcast signatures are created selectively and in limited numbers, it now becomes possible to store them for later classification processing. For example, remote monitoring devices could simply create and store broadcast signatures and send them to a central computer facility for classification. This could decrease the cost of the monitoring system significantly. Alternatively, if both processes are to be performed at the monitoring site, classification no longer must keep pace with feature extraction, which is quiescent for most of the time. Broadcast signatures could be placed in buffer storage for classification processing during this idle time, and classification could take much more time than would have been possible in the prior art. This means that the library of reference signatures used in this process could be much larger and more programs could be broadcast monitored.

For the purposes of this invention, any readily-detectable signalling event may be used as a cue signal as long as it occurs every time that a program which is to be identified is broadcast. It will be seen that there are many possible such signalling events.

The cue signal may be an "artificial" signal which is inserted into the program signal specifically for this purpose and is unrelated to the actual program information, in which case it is, by definition, an ancillary signal. Alternatively, the cue can be a "natural" signalling event which occurs as part of normal broadcasting procedures and which is part of the normal program signal, such as the start or the end of the program. Such natural signals are referred to herein as non-ancillary signals. Non-ancillary signals have the advantage of avoiding any possible program degradation and, therefore, not requiring FCC approval.

The cue signal can either be "exclusive" or "non-exclusive". If exclusive, the cue occurs only when a program to be identified is broadcast. If non-exclusive, it can occur at other times as well, as long as it occurs each time that a program which is to be identified is broadcast. However, the more exclusive the cue signal is, the more useful it will be in differentiating broadcast programming, the fewer unidentifiable signatures will be formed, and the less data processing will be required.

Moreover, the cue signal can be either a "positive" or a "negative" signal. A positive cue is the presence of a signal which is normally absent; a negative cue is the absence of a signal which is normally present.

In television, the cue signal may be placed in either the audio or video portions of the broadcast signal, but in radio, placement is obviously limited to the audio. If in the video, the cue signal can be contained either in the active picture raster or in the vertical blanking interval.

Some examples of possible signalling events which can be used as cue signals are discussed below. One such signalling event might be a pure tone of a certain frequency and duration inserted into the sound track of programs to be identified but virtually never present otherwise. This would be a positive, exclusive, audio cue signal and would have the broadcast possible utility since it would be compatible with all recording and broadcasting media. A similar type of cue, but video rather than audio, would be an image of a certain shape and size in the picture raster. In most cases, such positive, exclusive, audio or video cue signals will be ancillary signals and therefore must be subliminal. In some instances, however, such signals can be non-ancillary and, therefore, perceptible to the human audience. For example, an ideal non-ancillary cue signal for monitoring network clearances is an audio or video network logo, which signals to the audience the identity of the network and occurs with virtually every network show.

In order to signal to the audience a transition from one program to another, broadcasters separate the end of one program signal from the beginning of another by "dead air", i.e., blank frames. Such program changes can be detected by analyzing the broadcast signal for the presence or absence of the program signal. Thus, a blank field which is followed by a field containing picture information indicates the start of a program, and a picture field followed by a blank field signals the end of a program. Each of these non-ancillary signalling events can be used as a cue signal because they always occur when a program which is to be identified is broadcast, even though they occur at other times as well. Since a blank field is the absence of the normally present program signal, this would be a negative, non-ancillary, non-exclusive, video cue signal in the picture raster. (Even when not used as cue signals, such program-start and program-stop signals are very useful in measuring program duration and in identifying the existence of "strings" of commercials.)

Another possible negative cue signal is the absence of the normally present vertical interval reference signal (VIRS) on line 19 or the vertical interval test signal (VITS) on line 17 for a predetermined period of time (e.g., one field) only when a program which is to be identified is broadcast. This would be an ancillary, negative, exclusive, video cue signal in the vertical blanking interval. The same type of signal, except positive rather than negative, would be the presence of a signal on an otherwise unused portion of a line in vertical blanking interval, such as line 20.

It should also be noted that more than one cue signal can be used in combination in the present invention. For example, a single network logo appearing in a program would alert the system that a network program which is to be identified is being broadcast, but the actual sampling and feature extraction processes would be initiated only upon the detection of program changes within the program, such as those occuring as a result of commercial breaks.

While some of these cue signals are positive ancillary signals such as those used in Method A of the prior art, the program identification codes of Method A are absent, their function being accomplished by pattern recognition processing. The information content of the ancillary signal is thus reduced to the absolute minimum. The amount of the time domain occupied by the signal is thereby also reduced to the minimum necessary for detection. This invention thus eliminates the time-domain problems encountered in the prior art. For example, a positive cue signal in the vertical blanking interval would occupy a much smaller portion of a scanning line than Haselwood, thereby preempting much less of this valuable spectrum space. An audio cue signal, on the other hand, would solve the audibility problem by reducing the time duration of the signal to such an extent that absolute audibility threshold would increase, and by allowing the signal to be masked effectively by program audio.

BRIEF DESCRIPTION OF THE DRAWINGS

The invention, and its method of operation, together with additional objects and advantages thereof, can be better understood by reference to the following detailed description considered in connection with the accompanying drawings wherein.

DETAILED DESCRIPTION OF THE PREFERRED EMBODIMENT

Figure 1:
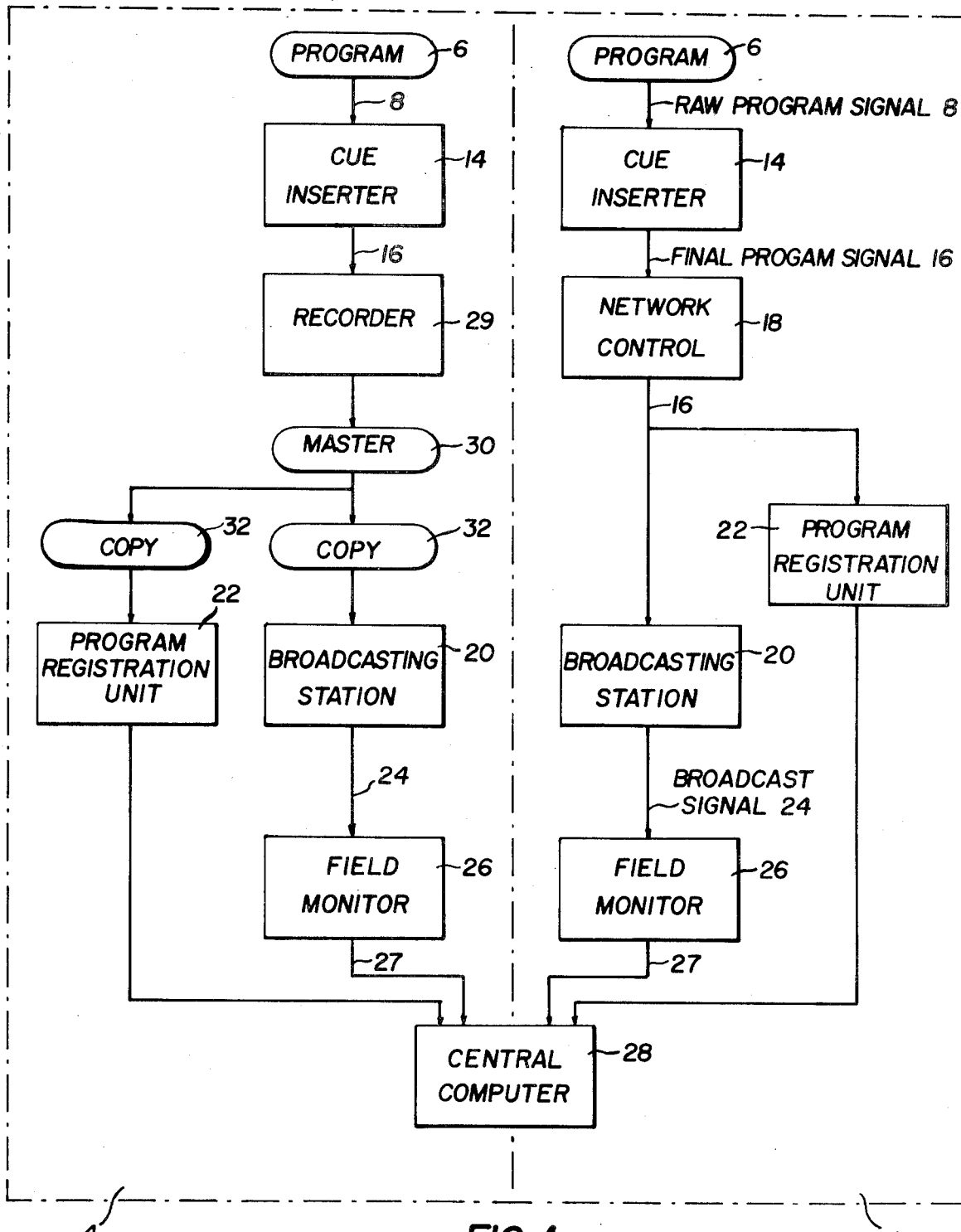
FIG. 1 is a block diagram of a broadcast monitoring system, including sub-systems for monitoring both network- and station-originated broadcasts, according to the method of the present invention.

Referring now to the drawings, wherein like reference numerals designate the same or corresponding parts throughout the several views, FIG. 1 shows in block diagram the overall operation of a broadcast monitoring system according to the invention. This system includes two sub-systems, as shown: one for monitoring network-originated programs 2 and another for monitoring (pre-recorded) station-originated programs 4.

In the first, programs 6 are distributed to a number of broadcasting stations from a central programming source, the network. A program 6 can either be live or recorded on some medium such as film, tape, or disc. From this program 6 is generated an analog signal 8 containing the program information.

If an ancillary cue signal is used, insertion of cues into the raw program signal 8 is accomplished by means of a cue inserter 14 at the time of network origination. (If the program 6 is pre-recorded, cue insertion can be done as part of the production process.) In either case, the final program signal 16 originated by network control 18 will contain at least one cue signal for each network program 6. (If the cue signal is a non-ancillary signal, the final program signal 16 containing cue signals will be the same as the raw program signal 8 generated from the original program 6.) This final program signal 16 is distributed from network control 18 to an affiliated broadcasting station 20.

It should be noted at this point that the term "program signal" is used throughout this application to designate either the composite video signal or the audio signal, or even both, where appropriate. (These components of the program signal are not shown in FIG. 1.) Thus, the raw program signal 8 can include a video component 7 and/or an audio component 9; similarly, the final program signal 16 can refer to either a composite video signal 15 or an audio signal 17 (or both) which include cue signals.

Each network program 6 is registered for monitoring at the time of its origination. The registration unit 22 analyzes this network program signal 16 as it is fed into the distribution system. When a cue signal is detected within the signal 16, a feature extraction process is performed by the registration unit 22, which results in the creation of a reference signature for each network program. A real-time clock is also read and a digital time code representing the time of program origination is associated with each reference program signature. These reference signatures and associated time-of-origination codes, along with program identification labels and any other data necessary to provide the various monitoring services, are entered into the system's central computer 28 and stored in memory.

The broadcasting station 20 can either broadcast a network program at the time it comes in on the network feed, or record it on videotape and broadcast it later (delay broadcast), or not broadcast it at all. Whenever a network program is broadcast by a monitored broadcasting station 20, its broadcast signal 24 will be received by a field monitor 26, which continuously examines this signal 24 for the presence of cue signals. When a cue is detected, the field monitor 26 executes the same feature extraction process to derive a broadcast signature of unknown program identity. A real-time clock is read and a digital time code representing the time of program broadcast is associated with each broadcast signature. If the cue signal is other than a program start or stop, the monitor also detects all such program changes, simply noting the time of each.

By means of a telecommunications link 27, these broadcast program signatures and associated time-of-broadcast codes are transfered to the system's central computer 28, which identifies each broadcast program by means of a classification process wherein each broadcast signature is compared to one or more reference signatures.

There are two modes of classification processing: verification and recognition. The verification mode is used when an unidentified program is supposed to be a certain known program; its signature is simply compared to the reference signature of the presumed known program to verify its identity. The recognition mode is used when there is no basis for such a presumption of identity, in which case the unidentified signature must be compared iteratively with reference signatures either until there is a match and the program is identified or until the set of reference signatures is exhausted and the program is classified as unidentifiable. Obviously, if the verification mode results in positive identification, it requires much less data processing than the recognition mode, so it is always done first.

In the network monitoring system 2, the broadcast schedules of most programs are known in advance, so most of the classification processing is in the verification mode. Classification takes place in three stages, the first two of which are verification. At each stage, whenever the broadcast of a network program is identified, both the broadcast signature and the reference signature are eliminated from all further processing.

The first stage identifies programs that have been broadcast directly from the network feed. Each reference signature generated during network programming is compared to the broadcast signature whose time-of-broadcast time code is the same as the time-of-origination code of the origination signature. A positive verification indicates a real-time clearance of the program. Most broadcasts of network programs are identified at this stage.

Classification then proceeds to identify delayed broadcasts. The set of reference signatures used in this processing includes those from network programs whose clearance had not been verified in the first stage, plus all programs that had been fed to the station during the previous week but which had not yet been broadcast.

Since changes in a station's broadcasting schedule occur relatively infrequently, the times of most delayed broadcasts are known from prior experience. The second stage of classification processing is thus also in the verification mode: the broadcast signature created at the time of each presumed delayed broadcast is compared to the reference signature of the assumed network program.

In the final stage, classification processing switches to the recognition mode in order to identify unusual delayed broadcasts. Each remaining broadcast signature is compared to remaining reference signatures either until the broacast program is identified or until the set of reference signatures is exhausted.

Referring again to FIG. 1, in the sub-system 4 for monitoring station-originated broadcasts of pre-recorded programs such as "spot" commercials, cue signals (if ancillary) are inserted into all programs to be identified as the last step in producing the program master 30. Either the video 7 or audio 9 portion of the program signal 8 is applied to a cue inserter 14, which adds a cue signal at one or more locations within the program signal 8. The output of the cue inserter 14, which is the final program signal 16 containing cues, is recorded by means of the recorder 29. This recording 30 is the program master from which all program copies 32 distributed for broadcast are duplicated.

A copy 32 of each such program is applied to a registration unit 22, which detects the cue signals contained therein and thereupon executes a feature extraction process to form a reference signature for the program. This reference signature is entered into the system's central computer 28 and stored in memory.

When a program copy 32 containing one or more cue signals is broadcast by a monitored broadcasting station 20, cue signals are detected within the station's broadcast signal 24 by the field monitor 26, which functions in the same way as described above with reference to the network monitoring sub-system 2, creating and collecting broadcast signatures of unknown program identity and time-of-broadcast codes. This data is entered into the system's central computer 28, which performs the classification processing to determine the identity of broadcast programs. In this case, however, the broadcast schedules of most programs are not known in advance, so virtually all classification is in the recognition mode.

(Note that the term "broadcast" is used in this discussion primarily to mean over-the-air radiation of the transmitted signal. However, it should be recognized that the present invention would work equally well in a system where the distribution of the broadcast signal is by cable or other non-radiated means. Hence, in terms of the applicability of the present monitoring system and method, the word "broadcast" as used herein should be considered to include any form of electronic distribution of a program signal from one point to another. Another point worth mentioning is that, while FIG. 1 shows the field monitor 26 receiving a radiated signal 24 at a site remote to the broadcasting station, it would clearly be possible to locate the monitor 26 on the broadcaster's premises.)

Figure 2:
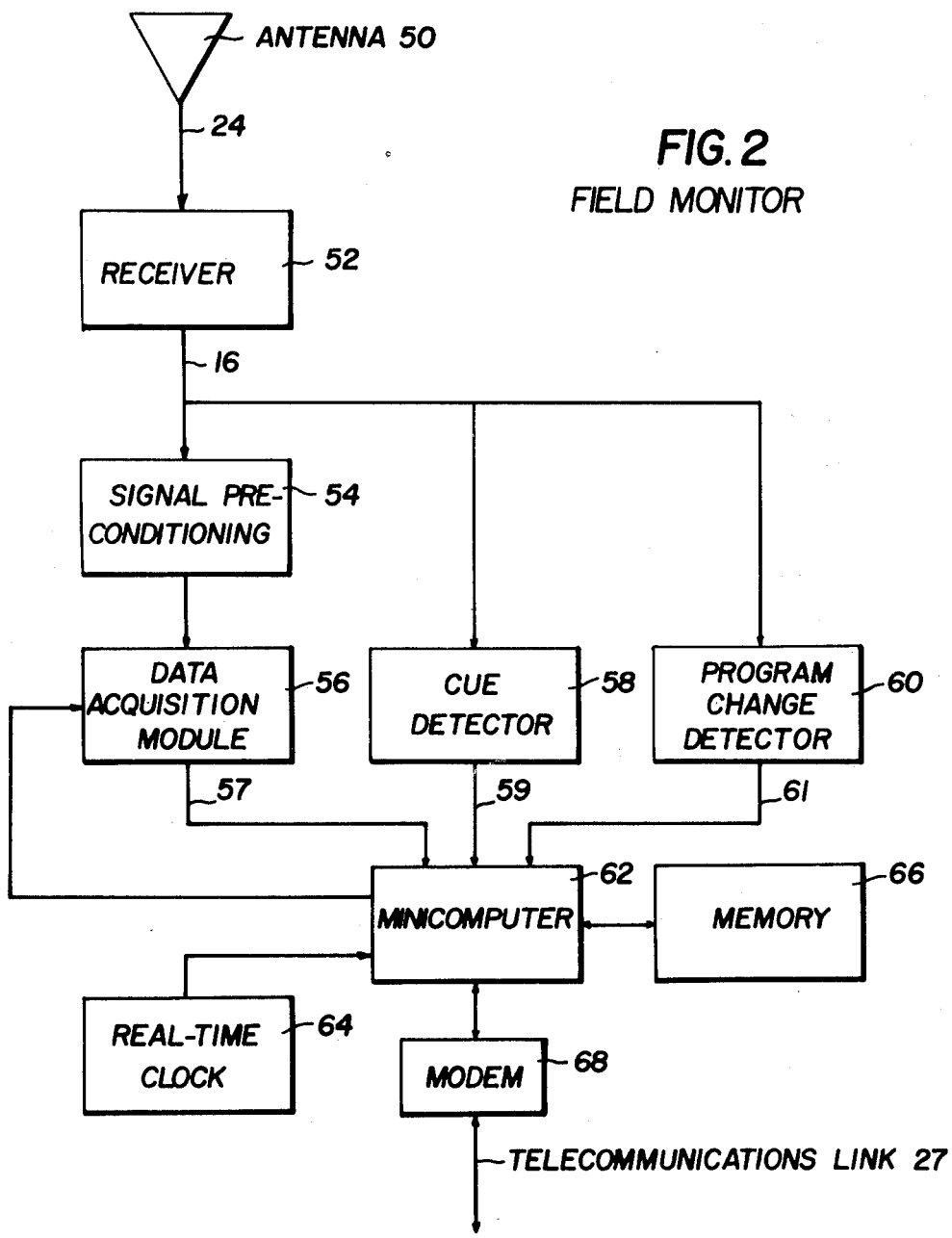
FIG. 2 is a block diagram of a remote field monitor of a broadcast monitoring system according to the invention.

In FIG. 2 is shown the preferred embodiment of a field monitor 26 according to the invention. The broadcast signal 24 from a monitored broadcasting station 20 is acquired by the receiving antenna 50 and fed to a receiver 52, which includes a tuner and amplifier. The output of the receiver 52, which is the program signal 16 containing cue signals, is then fed to a cue detector 58, a program-change detector 60, and a data acquisition module 56. If the feature extraction algorithm calls for some form of signal preconditioning, such as filtering or rectification, the program signal 16 first passes through a preconditioning module 54 prior to reaching the data acquisition module 56. The cue detector 58, the program-change detector 60, and the data acquisition module 56 all output to a computer 62.

When the computer 62 receives detection output 59 from the cue detector 58 indicating the presence of a cue signal, it enables the data acquisition module 56 and takes from this module 56 digitized program information 57 to be used in forming the broadcast signature. The computer also reads the output of a real-time clock 68, from which it creates a time-of-broadcast code for the signature.

The computer 62 can be virtually any minicomputer, such as a PDP 11 computer manufactured by Digital Equipment Corporation of Maynard, Massachusetts. There are a variety of off-the-shelf component systems that can be used for the data acquisition module 56, such as the DT2762 Data Acquisition System manufactured by Data Translation Incorporated of Natick, Massachusetts, which has a 12-bit analog-to-digital converter with a 35 MHz throughput and a sample-and-hold module on its input with a 10-nanosecond window to ensure accuracy at the throughput rate. In the preferred embodiment, the real-time clock 64 is simply a short wave receiver tuned to the WWV signal broadcast by the National Bureau of Standards. This WWV signal is itself a digital time code of extremely high accuracy, which is read by the computer.

Program information in either the video 15 or audio 17 portions of the program signal 16 can be used in the feature extraction process, and there are many feature extraction algorithms that can be used to form program signatures. In the preferred embodiment, the audio portion of the program signal 17 is used and the spectral composition of the audio signal is analyzed. This approach is advantageous because the spectral composition of the audio program signal over time is unique to each program and provides a high degree of unambiguous differentiability. Signal preconditioning 54 consists of bandlimiting by a single pole active filter whose −3 dB point is 2 KHz, the purpose of which is to restrict the frequencies being digitized to those most often present in programs to be identified.

When the computer 62 receives a detection output 59 from the cue detector 58, it activates the data acquisition module 56 for a period of four seconds. The data acquisition module 58 digitizes the bandlimited program audio signal, samples at the rate of 4 kHz, and passes this data 57 to the computer 62. Each one-second segment is treated as a separate sample. Thus, the detection of each cue signal results in the generation of four "blocks" of data each containing 4096 points, and each point having a value between 0 and 4095. The data is then normalized by setting the largest value in the entire data set (all four one-second blocks) to 1023 and adjusting all other values proportionately.

From this sampled program information, the computer 62 forms a feature set by measuring the relative energy within certain frequency bands of each one-second block of data. The 4096 points in each block are divided into 16 sub-blocks of 256 each and the power spectrum for each sub-block is computed using a standard Fast Fourier Transform, giving 16 sub-estimates. These sub-estimates are then averaged to obtain a single, 256-point estimate of the power spectrum of the entire 1-second block of raw data. This data is reduced even further by partitioning the power spectrum into 32 frequency bands, and computing the total energy in each band. The four 32-point feature vectors resulting from each one-second block of data are concatenated to produce a single 128-point vector, which is the signature used to characterize the program.

As they are formed, broadcast signatures are stored, along with time-of-broadcast codes, in a memory device 66 by the computer 62. Periodically, the central computer 28 polls each field monitor 26 over a telecommunications link 27 by means of the communications modem 68, collects the accumulated data, and performs the classification processing to identify the broadcast programs. In the preferred embodiment, the telecommunications link 27 is a voice-grade telephone line.

Note that, while in the preferred embodiment the segment from which program information is sampled follows the cue signal, it could also precede the cue. In this case, the data acquisition module 56 would run continuously, its output going to a buffer memory capable of holding 4-seconds worth of digitized program information. Upon detection of a cue signal, the computer 62 would take the data from the buffer memory and complete feature extraction.

The function of the program-change detector 60 is to identify the beginning and end of each program broadcast. The detection output 61 of the program-change detector 60 consists of two types of signals: a program-start signal is output when at least one blank field in the program composite video signal 15 is followed by a picture field, and a program-stop signal is output when at least one blank field follows a picture field. From the output of the real-time clock 68, the computer 62 determines the precise time of each type of output from the program-change detector 60 and stores this data, which can be analyzed after the classification process to determine the duration of identified programs, their position within commercial "strings", invalid program interruptions, and other useful information.

In the system for monitoring station-originated broadcasts 4, a program's reference signature in most cases is formed prior to the program's broadcast by the broadcasting station 20. Consequently, it is possible to maintain a library of reference program signatures in the computer 62 of each field monitor 26 and this computer 62 can perform the classification processing on site. This has the advantage of significantly reducing the amount of data transmission required and, hence, operating costs. (In this case, the central computer 28 must periodically update the library of reference signatures stored in the memory 116.) In the network monitoring system 2, however, this approach is not practical because the reference signature of most programs is not known in advance of the broadcast and the set of reference signatures changes daily.

It should be noted that the spectral analysis performed in the feature extraction algorithm described above might also be accomplished in analog. The signal preconditioning module 54 could be an array of band-pass filters, with a data-acquisition module 56 digitizing the output of each filter. The output of the data-acquisition modules 56, representing the energy in each band of frequencies could simply be integrated and averaged over the sampling period to approximate the power spectrum of the program sample and form the program's signature. Alternatively, a single spectrum analyzer with digital output could be used in place of both the signal preconditioning 54 and data-acquisition 56 modules. In either configuration, since the minicomputer 62 is no longer needed to perform the Fast Fourier Transform, it might be possible to substitute for it one or more control microprocessors 132 at a significant cost savings.

There are a number of algorithms that can be used in classification processing. In the preferred embodiment, the Euclidean distance (root-mean-square deviation) between a given broadcast feature vector and a given reference feature vector is computer. If this distance is less than a specified upper limit (recognition threshold), the broadcast program is assigned the identity of the program from which the reference feature vector was derived.

The registration unit 22 used to derive program reference signatures has the same basic design as the field monitor 26 just described, the principal difference being the source of the program signal 16. Instead of the receiving antenna 50 of the field monitor 26, the source of the program signal 16 in the registration unit 22 of the network monitoring system 2 is the network feed signal originated by network control 18. In the system for monitoring station-originated broadcasts 4, the source is a film or videotape playback unit. (In this case, of course, the tuner portion of the receiver 52 is unnecessary.) The function of the program-change detector 60 in the registration unit 22 is simply to enable the computer 62 to measure the precise duration of each program, i.e., the time between detection of program-start and program-stop. This information is stored along with the reference signature so that any interruptions (up-cuts, down-cuts, or center-cuts) in a broadcast can be identified. In addition, program identity and any other necessary information for each reference signature must be entered into the computer 62 of the registration unit 22 at the time of registration. In the preferred embodimient, an operator enters this data at the console of computer 62. All of this data is then entered into the central computer 28.

As noted earlier, there are a number of possible signalling events which can function as a cue signal. Five such signalling events have been mentioned: an audio tone, a network logo or some other positive signal in the active picture raster, a program change (either a program start or stop), a temporary dropout of the VIRS or VITS, and a signal on an otherwise unused portion of a line in the vertical blanking interval. The cue detector 58, of course, must be designed to detect whichever signal is being used.

In the case of an audio cue consisting of a pure tone of a certain frequency and a certain duration, the cue signal detector 58 consists in the preferred embodiment simply of a phase locked loop (PLL), such as the Model 567 Tone Decoder/Detector Phase Locked Loop manufactured by the Signetics Corporation of Sunnyvale, California. With its center frequency set to the frequency of the cue signal and a sufficiently wide capture range to allow for shifts in frequency due to velocity variations in broadcasting playback equipment, the PLL locks onto the cue signal audio tone whenever it is present in the program audio signal 17 and sends output to the computer 62 indicating lock. By measuring the duration of the lock output, the computer measures the duration of the audio tone to ensure that it is consistent with that of a cue signal, rejecting any spurious tones of the same frequency that might occur.

Figure 3:
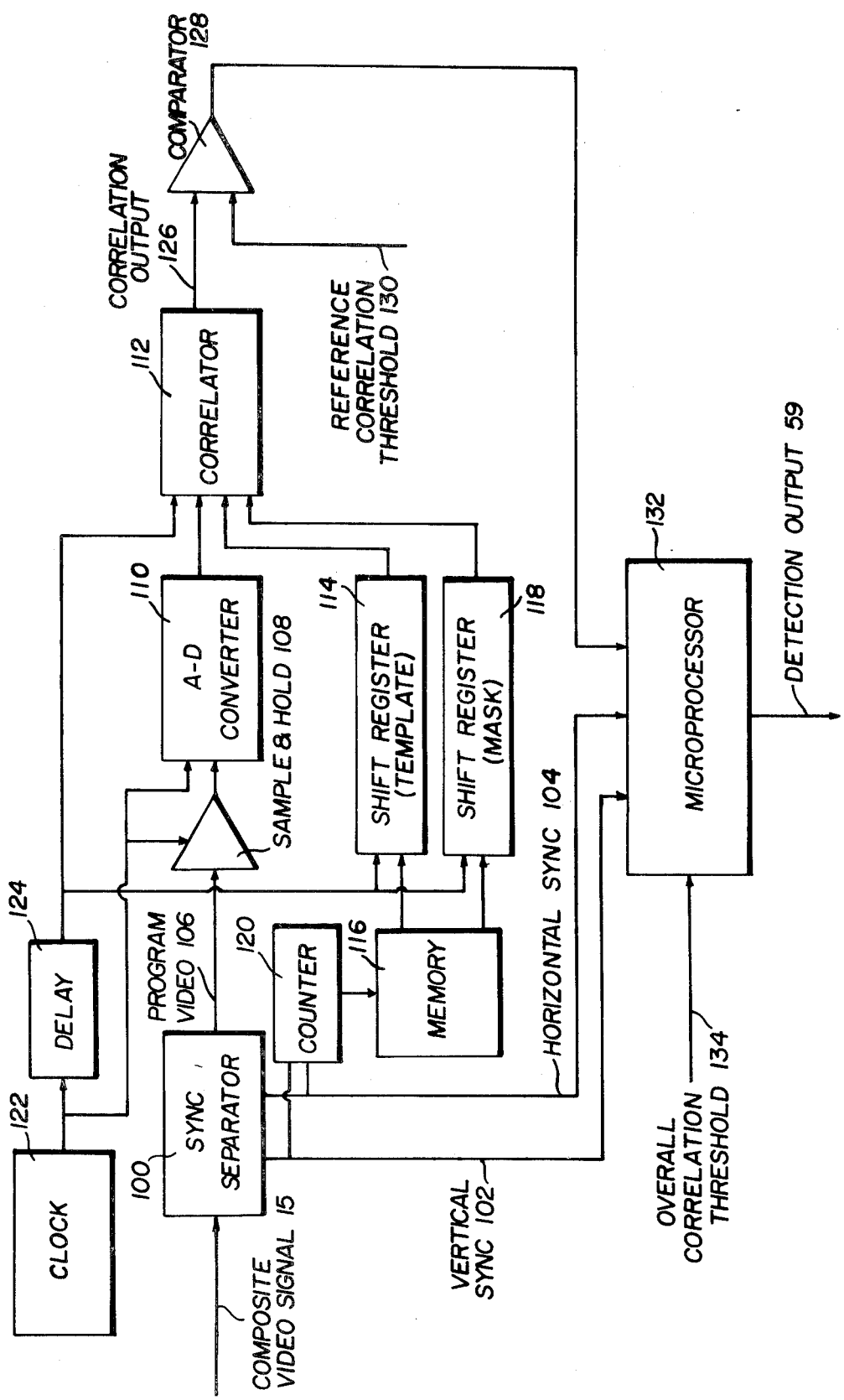
FIG. 3 is a block diagram of a video cue detector according to the invention.

FIG. 3 shows a cue detector for a positive cue in the active picture raster according to the preferred embodiment. Such a cue signal can be any predetermined pattern at any location within the video signal 15, including both subliminal ancillary signals and non-ancillary signals such as network logos. In this embodiment, detection of such a video cue involves a separate pattern recognition process in itself.

The composite video program signal 15 is first fed into a sync separator 100, which separates vertical and horizontal sync pulses 102,104 from the actual program video information 106. The program video 106 is then digitized by an analog-to-digital converter (ADC) 110 with a sample-and-hold module 108 on its input. The output of the ADC 110 is read into register A of the correlator 112. The correlator 112 correlates each horizontal line of a field of the digitized video signal 106 with the corresponding line of a "template" field stored in a memory 116, which is the reference signature of the cue signal.

In the preferred embodiment, a one-bit ADC 110 samples the digitized program signal at a rate of 4 MHz, generating a 256-bit word for each horizontal line of the video signal 106. There are commercially-available LSI (large-scale integrated) components which can be used in the correlator 112, such as the TDC 1004J Correlator manufactured by TRW LSI Products of Redondo Beach, California, a 64-bit digital correlator with analog correlation output, capable of operating at 15 MHz. The correlator 112 thus consists of four such 64-bit TDC 1004J correlator chips in series, the analog output of each being summed to yield the correlation output 126 for each pair of 256-bit words.

Each word (line) of the template field is read into register B of the correlator 112 from the template shift register 114. In addition, in cases where the cue signal occupies only a portion of the active picture raster, a word (line) containing "no compare" bit positions is also read into the mask register of the correlator 112 from the mask shift register 118. The "no compare" bits cause the correlator 112 to ignore the correlation of the corresponding bits in registers A and B of the correlator 112, thereby allowing the cue detector 58 to examine only a portion of the video signal 15. (If the cue signal occupies the entire picture raster the use of the mask is unnecessary.) Both the reference field and the mask are stored in the memory 116.

The actions of the correlator 112 and the shift registers 114,118 are strobed by a gated 4-MHz clock 122; a delay 124 allows for the settling time required to digitize the video program information 106.

Besides the video output 106, the sync separator also outputs each vertical sync pulse 102 and horizontal sync pulse 104. The horizontal line counter 120 counts each horizontal sync 104; its output is the address of the next word (line) of the reference field and the mask to be read into the shift registers 114,118. The counter is cleared with each vertical sync pulse 102.

The correlation output 126 of the correlator 112 is compared by the comparator 128 to a specified threshold reference voltage 130. The comparator 128 sends output to a microprocessor 132 only if the correlation output exceeds this threshold. The microprocessor 132 counts the number of lines in each field which exceed the correlation threshold 130. At each horizontal sync pulse 104, the microprocessor 132 registers a "1" if it has received output from the comparator 128, otherwise a "0".

At each vertical sync pulse 102, the microprocessor performs various logic operations to determine if the cue signal was present in the preceding frame. Primarily, it compares the number of the appropriate lines which exceed the correlation threshold 130 to the desired overall correlation threshold 134. If this number exceeds the threshold, the microprocessor 132 sends a detection output 59 to the computer 62. For example, if the correlation threshold reference 130 is 60% and the desired overall correlation threshold 134 is 80%, detection output 59 would be generated whenever 80% of the appropriate lines in a field of the proram video signal 15 correlate with the corresponding lines of the template field more than 60%.

The video cue detector described above is a highly versatile design. Not only can it be used for positive cues in the active picture raster, but it can also be used for positive or negative cues in the vertical blanking interval since the use of the mask can restrict examination to any portion of the video signal. It should be noted that the only difference between positive and negative video cue signals with respect to this design is the logic operations used by the microprocessor 132 to identify the presence of a cue.

Moreover, this design can also be used for the program-change detector 60. In this case, the reference (template) field stored in the memory 116 is that of a blank field, consisting of all zero's. (There is no mask). If the overall correlation exceeds the specified threshold 134, the presence of a blank field is indicated, while two consecutive vertical sync pulses 102 without such a correlation indicate the presence of a picture field.

Figure 4:
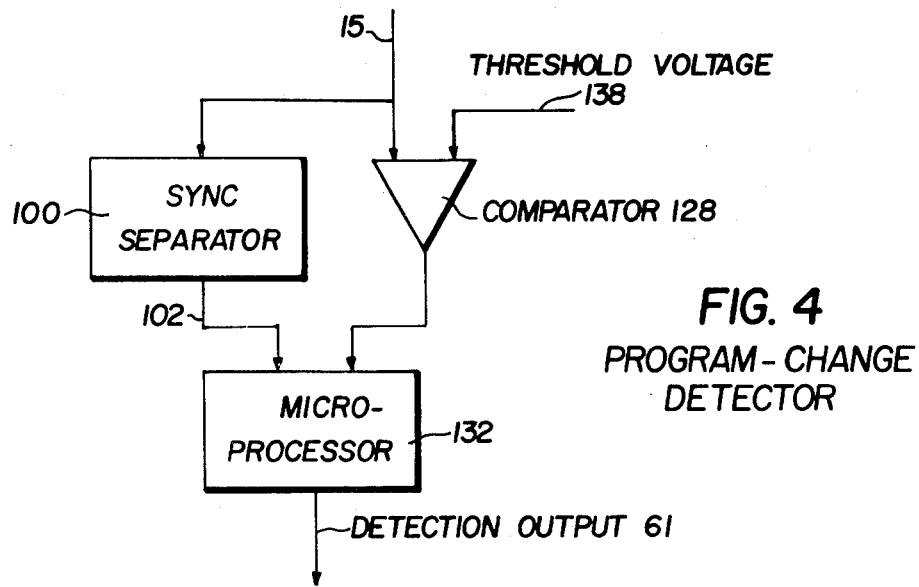
FIG. 4 is a block diagram of a program-change detector according to the invention.

FIG. 4, however, shows a simpler design for the program change detector 60. In this embodiment, the composite video signal 15 is fed to a comparator 128 and a sync separator 100. The function of the comparator 128 is to determine whether the white level in the program signal 15 exceeds a certain threshold level, indicating the presence of picture information. This is done by comparing the voltage of the program signal 15 to a reference voltage 138. If the program signal 15 voltage falls below the reference voltage 138, the white level exceeds the threshold level and the comparator 128 outputs a signal to a microprocessor 132 to indicate that picture information is present. The sync separator 100 functions in the same way as described above; in this case, only the vertical sync pulse 102 is fed to the microprocessor 132. Two consecutive vertical sync pulses 102 without an output from the comparator 128 indicates the presence of a blank field.

In either design of the program-change detector 60, the microprocessor 132 sends a program-stop output to the computer 62 when it detects a field with picture information followed by some number of blank fields. In the preferred embodiment, a transition between programs is defined as a minimum of four consecutive blank fields. (This is to allow for imperfect tape edits within programs). A program-start output is generated when the required number of blank fields is followed by a field containing picture information.

As has been noted, the start or stop of a program can themselves be used as the cue signal in the present invention. In this case, the cue detector 58 and the program-change detector 60 are the same component.

Figure 5:
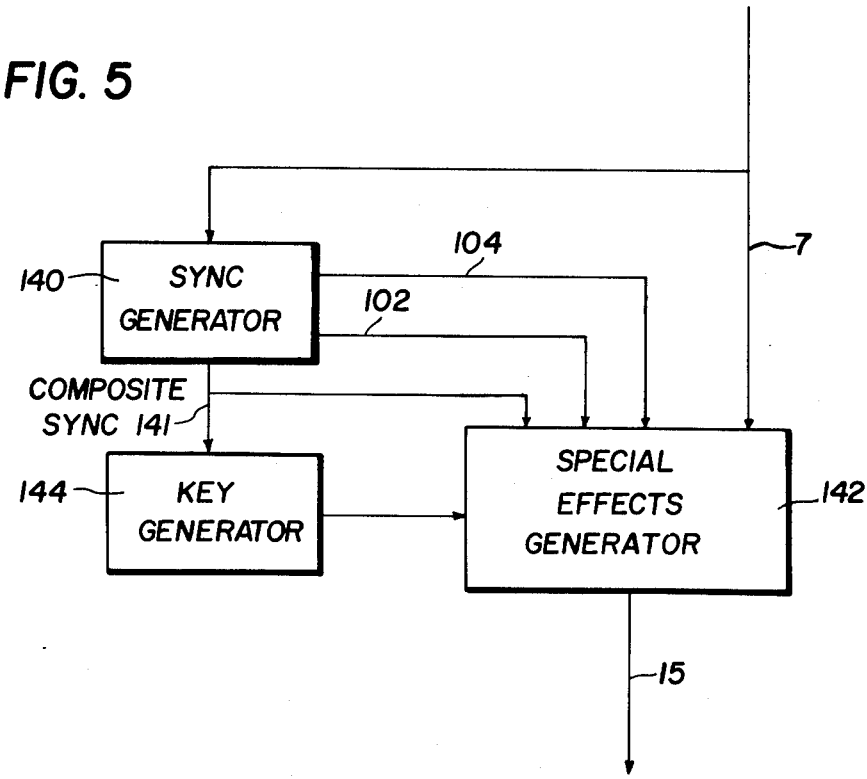
FIG. 5 is a block diagram of a video cue inserter according to the invention, wherein the cue is a signal in the active picture raster of the television signal.

FIG. 5 shows a cue inserter 14 for a subliminal cue signal in the active picture raster. In this case, cue insertion involves a standard method used by broadcasters for superimposing one image over another in the television signal.

The raw program composite video signal 7 is fed to a sync generator 140 and a special effects generator 142. The sync generator 100 can be any standard unit which has genlock capability and which outputs a composite sync, such as the Dynair Model SY-5990A Color Sync Generator with the Model SY-5995A Genlock Module, manufactured by Dynair Electronics Corporation of San Diego, California. The special effects generator can also be any standard unit such as the Dynair Model SE-260A. The sync generator 140 locks onto the incoming video signal 7 and outputs vertical 102, horizontal 104, and composite 141 sync pulses to the special effects generator 142 in precise phase with the syncronizing information of the incoming video signal 7.

The cue signal, which is an arbitrary pattern, is produced by the key generator 144. In the preferred embodiment, this is a device similar to standard character generators commonly used in broadcasting. When enabled by an operator, the key generator 144 inputs this video pattern to the special effects generator 142 for the desired number of fields. The composite sync 141 output from the sync generator 140 functions as the clock pulse for the key generator 144. The special effects generator 142 combines the two video sources by stripping out the program video information 106 contained in the raw composite video signal 7 at the appropriate times and inserting instead the signal generated by the key generator 144, thus superimposing the cue pattern over the original program picture. The output of the special effects generator 142 is the final program composite video signal 15.

Figure 6:
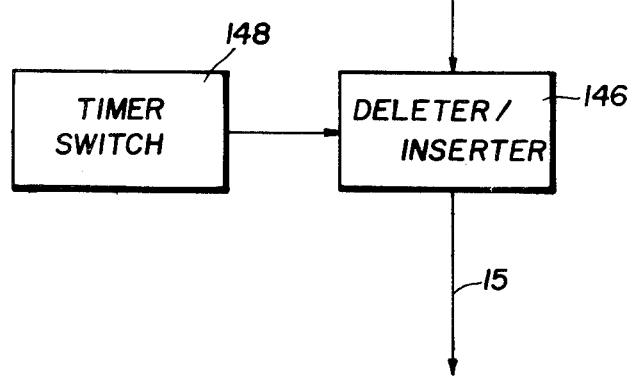
FIG. 6 is a block diagram of a video cue inserter according to the invention, wherein the cue is a signal in the vertical blanking interval of the television signal.

FIG. 6 shows a cue inserter for a video cue signal in the vertical blanking interval. The commercial availability of devices such as the 1441/1461 Deleter/Inserters manufactured by devices such as the 1441/1461 Deleter/Inserters manufactured by Tektronix, Incorporated of Beaverton, Oregon makes the design of such a cue inserter a relatively trivial task. The raw program composite video signal 7 is simply fed through a deleter/inserter 146. The deleter/inserter 146 has three basic modes: in the "bypass" mode, it passes the composite video signal through unchanged; in the "delete" mode, it deletes any incoming signal from a particular scanning line; and in the "insert" mode, it deletes any incoming signal from the line and inserts a particular signal into the outgoing composite video. The line affected in this process can be programmed to any line in the vertical blanking interval. The Tektronix Model 1441 is for use with dropouts in the VIRS, while the 1461 is for use with either dropouts in the VITS or a positive cue signal on an otherwise unused portion of any line in the vertical blanking interval. The mode of operation of the deleter/inserter 146 is controlled remotely through a 24-pin connector provided with the unit. This connector is connected to a timer switch 148, which is controlled by an operator and which, when enabled, switches the mode of the deleter/inserter 146 for the desired amount of time.

For example, suppose the cue signal is a dropout of the VIRS or VITS from the video signal for a single field. In this case, the normal mode of the deleter/inserter 146 is "bypass" if the incoming video 7 already contains the VIRS/VITS or "insert" if not. When the operator decides to insert a cue signal, he enables the timer switch 148, which switches the mode of the deleter/inserter to "delete" for one sixtieth of a second and then back to its normal mode. If the cue signal is a positive signal, such as a single binary digit on a particular line in the vertical blanking interval of a single field, the process is precisely the same as above except that the normal mode of the deleter/inserter 146 is "delete" and the timer switch 148 switches it's mode to "insert" for a single field when enabled by the operator.

The output of the special effects generator 142 or the deleter/inserter 146, being the final composite video signal 15 containing cue signals is either recorded on a videotape recorder to produce the program master 30 or, in the case of a network program, is fed to network control 18 to be distributed to the network-affiliated broadcasting stations 20.

One of the important features of the present invention is that the cue can be an ancillary audio signal which, unlike the program-identifying ancillary signals of prior art method A, satisfies the two fundamental requirements of a monitoring system: reliability, and non-degradation of program quality. As noted earlier, an audio cue has the advantage of being compatible with all recording and broadcasting media.

The feasibility of an audio cue signal results from the reduction of the time duration of the signal to the minimum necessary for detection. This reduction makes it possible to increase the audibility threshold of the signal, in effect making it more difficult to be heard. An increase in the threshold means that the signal can contain a greater amount of energy without being audible, thereby improving reliability without causing degradation.

There are two factors in this increase in audibility threshold. First, at very brief signal durations, the threshold of a signal is a function of both the energy it contains and its duration. Studies of human audition have shown that audibility threshold is constant for tones lasting from one half second to infinity, and only sightly higher at a duration of 200 ms. However, as duration decreases below 200 ms, audibility threshold increases significantly. The threshold of a 20-ms tone is 10 dB higher than that of a 200-ms tone. (Garner, W. R., "The Effect of Frequency Spectrum on Temporal Integration of Energy in the Ear", *Journal of the Acoustical Society of America,* vol. 19, page 808, 1947; and Garner, W. R. and Miller, G. A., "The Masked Threshold of Pure Tones as a Function of Duration", *Journal of Experimental Psychology,* vol. 37, page 293, 1947). Thus, simply reducing the time duration of a cue signal to less than 200 ms results in a significant increase in audibility threshold.

The second factor in the increase of the audibility threshold for the cue signal is masking. It is commonly recognized that one sound can "drown out" another one. Masking is defined as this temporary loss of the ear's sensitivity to one sound (the signal) due to the simultaneous presence of another sound (the masker). Thus, by using the program audio as a masker, it should be possible to increase the audibility threshold of the ancillary signal, and thus its energy.

The key to successful masking of the cue signal is its brief duration. To insure complete masking, the signal being masked must be of equal or shorter duration than the masker. For all programs other than records, the only reasonable approach to masking with the program audio is to use speech as the masker, and more specifically to use components of speech, such as vowels and consonants. Since the typical duration of such speech "phonemes" is no more than 300 ms, it is clear that the cue signal must be relatively brief if it is to be masked effectively.

Studies of masking have found that white noise is a more effective masker than a pure tone. (Egan, J. P. and Hake, H. W., "On the Masking Patterns of Simple Auditory Stimuli", *Journal of the Acoustical Society of America,* vol. 22, page 622, 1950; and Hawkins, J. E. and Stevens, S. S., "The Masking of Pure Tones and Speech by White Noise", *Journal of the Acoustical Society of America,* vol. 22, page 6, 1950) Furthermore, when a signal is being masked by white noise, it has been shown that only frequencies within a relatively narrow band centered on the signal frequency actually contribute to the masking. This band is called the "critical band", and its width depends upon the signal frequency: the higher the frequency, the wider the critical bandwidth. A continuous tone is completely masked up to the point where the total noise energy in the critical bandwidth is equal to the signal energy. (Fletcher, H., "Auditory Patterns", *Journal of the Acoustical Society of America,* vol. 9, page 47, 1940) That is to say, the audibility threshold of the signal is 0 dB relative to critical bandwidth energy. If, further, the duration of the signal is reduced to 20 ms, this threshold increases to 10 dB.

Consonants are essentially combinations of brief periods of silence and bursts of noise, while vowels are basically combinations of relatively pure tones. (Heinz, J. M. and Stevens, K. N., "On the Properties of Voiceless Fricative Consonants", *Journal of the Acoustical Society of America,* vol 33, page 589, 1961; and Hughes, G. W. and Halle, M., "Spectral Properties of Fricative Consonants", *Journal of the Acoustical Society of America,* vol. 28, page 303, 1956) Of the two, consonants are the better maskers for three reasons. First, as noted above, noise is a more effective masker than pure tones. Secondly, the spectral composition of consonants varies less among different speakers than vowels, so consonants will thus be more universally available as maskers. And finally, the noise energy of consonants is distributed over a much broader range of frequencies than vowels, which are limited to no more than about 3 kHz. Thus, only the consonants could mask higher-frequency cue signals, which are advantageous because a shorter time duration is required to generate the number of cycles necessary for detection by the phase locked loop cue detector 58. The fricative consonants, which include the "s", "sh", and "z" sounds (plus the affricative "ch"), are especially effective as maskers as they usually contain greater amounts of energy than other consonants.

In the preferred embodiment, the audio cue signal is a 5 kHz sine wave with a duration of 20 ms. It is inserted into the program at points where it will be masked by noise energies present in the program audio. Ideally, noise energy within the critical bandwidth should be fairly evenly distributed and of significant magnitude, conditions which are likely to occur when fricatives are spoken. The cue will be inserted at a 4 dB level relative to the average energy in the critical bandwidth. This is still 6 dB below audibility threshold and 10 dB above the minimum signal-to-noise ratio (−6 dB) of the Signetics Model 567 Tone Decoder/Detector Phase Locked Loop.

Figure 7:
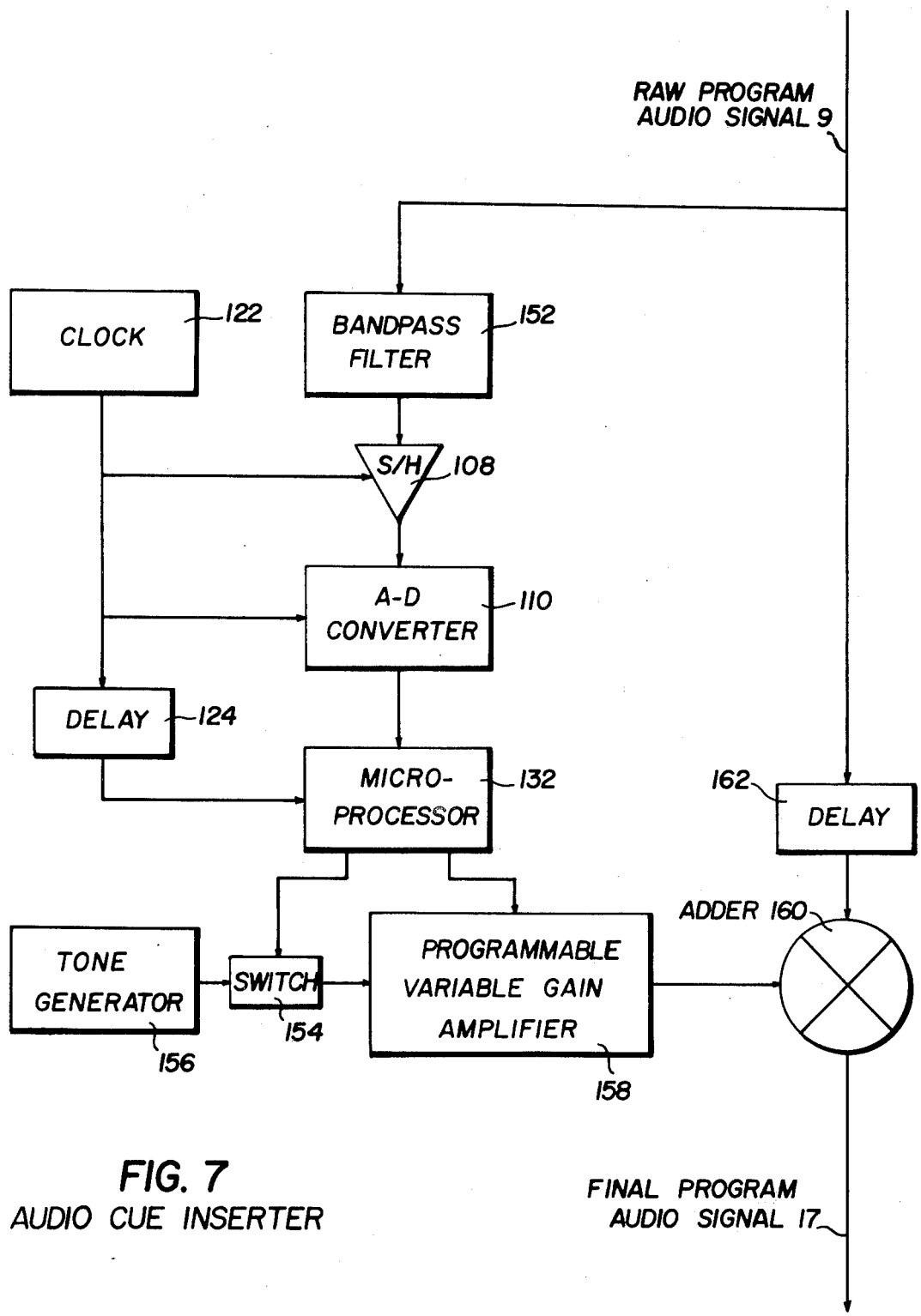
FIG. 7 is a block diagram of an audio cue inserter according to the invention.

Returning now to the drawings, FIG. 7 is a block diagram of an audio cue inserter according to the invention. The raw program audio signal 9 is fed to a set of bandpass filters 152 and an analog delay circuit 162. The bandpass filtering can be done by a single filter or multiple filters. The output of each filter 152 is digitized by an analog-to-digital converter 110 with a sample-and-hold module 108 on its input. The purpose of the bandpass filtering is to restrict the frequencies being digitized to those frequencies in the critical bandwidth of the cue signal frequencies. The critical bandwidth at 5 kHz is 300 Hz, so the bandpass filters 152 in the preferred embodiment attentuate all frequencies below 4.85 kHz and above 5.15 kHz. In the preferred embodiment, a single 300-Hz bandpass filter 152 is used. The output of the ADC 110, representing the total energy in the the critical band, is read by a control microprocessor 132.

The microprocessor 132 performs various programmed logic operations on the digitized signal and determines the location in the program signal at which to insert each cue signal. These logic operations comparing the total energy in the critical bandwidth to a specified threshold so that the energy in the cue will always exceed a certain minimum level. Another logic operation is to measure the duration of the energies in the incoming frequency bands in order to ensure that the duration of the masker is greater than the cue signal. Finally, the microprocessor 132 compares the elapsed time since the previous cue insertion in order to ensure minimum separation between cues. The actions of the control microprocessor 132 and ADC 110 are strobed by the clock 122, with a delay circuit 124 to allow time for the ADC 116 to settle.

When these logic operations result in the identification of a sound in the raw program audio signal 9 suitable for masking the cue signal, the microprocessor 132 enables the switch 154, holding it closed for the duration of the cue, which is 20 ms in the preferred embodiment. When this switch 154 is closed, the output of the tone generator 156, which is a 5 KHz sine wave in the preferred embodiment, is fed through a variable gain amplifier 158 and enters the adder 160. The amplification of the tone by this amplifier 158 is controled by the microprocessor 132 so that the cue signal is 4 dB relative to the total energy in the critical bandwidth of the masker. The microprocessor 132 sets the gain level of the programmable gain amplifier 158 equal to about 2.5 times the average integrated value of the ADC 116 output over the entire duration of the cue.

The delay 162 delays the program signal 9 so that the control microprocessor 132 has sufficient time to perform all of the various logic operations and generate the cue. Thus, the amplified output of the tone generator initially enters the adder 160 with the delayed program signal 9 at the time intended for cue insertion. It should be noted that, if the source of the program audio signal 9 is a tapedeck, as it usually will be, the function of the delay 162 can be accomplished by using two pickup heads instead of one. The bandpass filters 152 receive the audio signal 9 from a pickup head that is placed slightly in front of the second head, which supplies the program signal 9 to the adder 160. The spacial separation between the two pickup heads would create a time separation between the two signals which would allow the microprocessor 132 to perform its function.

The output of the adder, being the final program signal 17, is recorded by the recorder 162 on some recording medium, which is normally tape but can also be disc or film. This recording is the master copy 30 of the program.

It should be noted in passing that the various configurations of a monitoring system according to the present invention which have been described above assume the use of present-day, state-of-the-art solid state electronic devices in the design of the field monitors. It is felt that this approach is optimal in terms of economy, reliability, and speed of reporting. However, it is also possible to envision an embodiment of the invention in which the field monitors 26 tape record monitored broadcasts and in which both feature extraction and classification processing are performed by a central computer 28.

Figure 8:
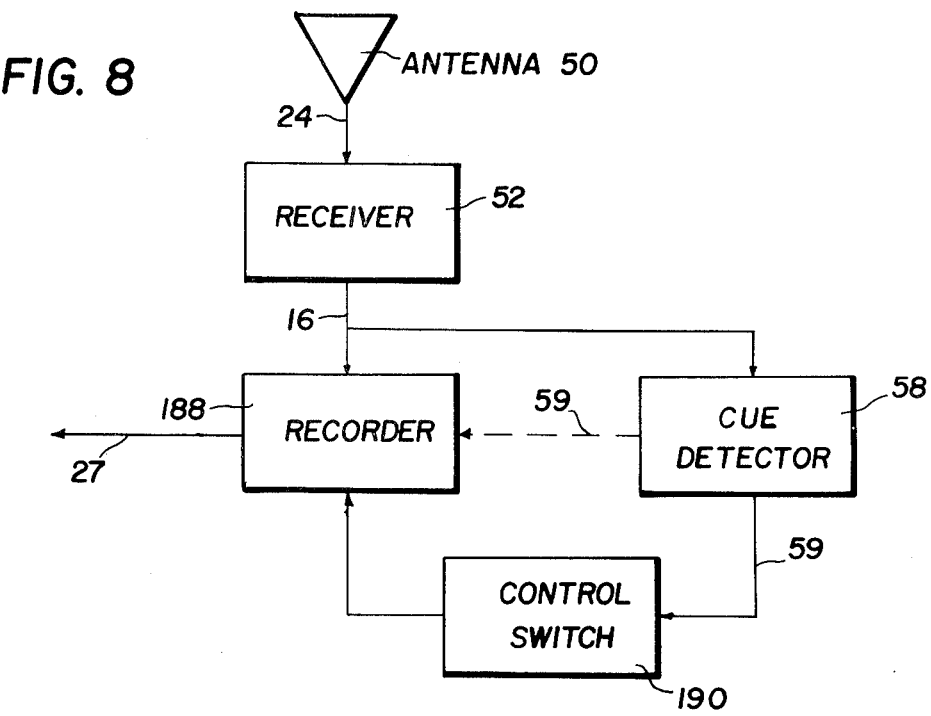
FIG. 8 is a block diagram of an alternative embodiment of a field monitor.

FIG. 8, for example, shows a diagram of a field monitor 26 which is designed for tape recording broadcasts. In this configuration, the program signal 16 output from the receiver 52 is recorded on tape by the recorder 188. (This can be either an audio or video tape recorder.) Actually, this is all that is absolutely necessary, for these tape recorded broadcasts could simply be shipped directly to the central computer 28. In this embodiment of a field monitor 26, of course, the link 27 between the monitor 26 and the central computer 28 is not a telecommunications link as defined above but a physical transfer of the tapes containing the recorded broadcasts.

Considerable advantage, however, is gained by detecting the cue signals at the monitoring site. For example, by adding a cue detector 58 and a control switch 190, the recorder 188 can be switched on when a cue is detected in order to record the program being broadcast, and then off again until the next cue is received. Thus, only programs containing cue signals are recorded. Alternatively, the tape recorder could record continuously and the output of the cue detector 58 could be fed directly to the recorder 188 (dotted line) and recorded on a separate track. This way, instead of the central computer 28 having to search the entire broadcast signal for cue signals, the tape can be advanced forward rapidly until the presence of a recorded cue detection output 59 on the otherwise empty track is sensed. In both cases, the amount of time required to process the tape recordings is significantly reduced.

In view of the description of the preferred embodiment and the discussion of alternative forms of this invention, it is clear that the method and system described herein do not depend exclusively on the addition of ancillary cue signals to broadcast program material. Provision has been made for using normally-occurring signalling events, such as network logos and interruptions in the program signal which separate different broadcast programs, as an effective means for selectively activating the feature extraction process.

Moreover, where ancillary cue signals are used, the present invention avoids the disadvantages that are attendant upon prior art methods involving the transmission of coded identification signals. By reducing the time duration of the ancillary signal to the minimum necessary for detection of the signal's presence, the present invention greatly reduces the chance of program degradation resulting from the signals and significantly increases the efficiency of utilization of scarce spectrum space.

Furthermore, in comparison to any monitoring scheme using only computerized pattern recognition techniques without combination with signalling events, the present invention avoids the burdensome necessity of continuous pattern recognition processing on the broadcast signal. This invention shows how the presence of either ancillary or non-ancillary cue signals can be used to provide at least four important and heretofore unvavailable functions: First, these cues differentiate the program segments from which reference signatures have been derived from all or most of the rest of the broadcast signal. Secondly, the cues act as synchronizing signals, ensuring proper registration in the sampling process so that the same program information is always used to form a program's signature. As a result of these advantages, the monitoring system can ignore all portions of the broadcast signal which are not associated with a cue, thus greatly reducing the amount of data processing required. Thirdly, the cue signals eliminate the need for concurrent feature extraction and classification processing, thereby allowing much more design flexibility. Finally, cue signals derived from the detection of blank fields in the broadcast signal provide a novel type of signalling event which accurately marks the start and stop of each broadcast program, thereby enabling precise measurement of program duration.

What is claimed as new and desired to be secured by letters patent of the United States is:

1. The method of identifying certain programs transmitted by a broadcasting station, wherein at least one predetermined and readily identifiable signalling event occurs in conjunction with the broadcast of ones of said programs, said method comprising the steps of:

generating a digital reference feature set from ones of said programs by a transformation of at least one segment of a said program's analog signal content, said segment beginning at a predetermined time with reference to one of said signalling events and being of a predetermined duration;

identifying by a label code the program from which each said reference feature set was derived;

storing a set of said reference feature sets and said associated program label codes in a memory;

detecting said signalling events within the broadcast signal of said broadcasting station;

generating a digital broadcast feature set from ones of said programs broadcast by said broadcasting station, said broadcast feature set being generated by said transformation of at least one segment of the analog broadcast signal content, said segment beginning at a predetermined time with reference to one of said signalling events and being of a predetermined duration;

comparing at least one said broadcast feature set to at least one said reference feature set to produce a recognition output when the degree of similarity between a broadcast feature set and a reference feature set meets a predetermined standard, the broadcast program from which said broadcast feature set was derived being identified by the program label code associated with said reference feature set.

2. The method of claim 1 further comprising the steps of:

generating a time varying code representative of the actual time in a predetermined time zone; and logging an instantaneous value of said time varying code corresponding to the time of broadcast of each program represented by said broadcast feature sets.

3. The method of claim 1 wherein at least one said signalling event is the presence of a predetermined signal within the broadcast signal of said broadcasting station in conjunction with the broadcast of ones of said programs by said broadcasting station, which predetermined signal is absent from the broadcast signal at at least some other times, further comprising the step of:

inserting said predetermined signal into said broadcast signal.

4. The method of claim 3 wherein at least one said signalling event is the presence of a predetermined signal within the audio portion of the broadcast signal.

5. The method of claim 4 wherein said predetermined signal is a tone of a predetermined frequency and duration.

6. The method of claim 5 wherein the duration of said tone is less than one half second.

7. The method of claim 3 wherein at least one said signalling event is the presence of a predetermined signal within the video portion of the broadcast signal;

8. The method of claim 7 wherein said predetermined signal is contained within the active picture portion of the video signal.

9. The method of claim 7 wherein said predetermined signal is contained within the vertical blanking interval of the video signal.

10. The method of claim 1 wherein at least one said signalling event is the absence of a predetermined signal within the broadcast signal of said broadcasting station in conjunction with the broadcast of ones of said programs by said broadcasting station, which predetermined signal is present within the broadcast signal at at least some other times, further comprising the step of:

deleting said predetermined signal from said broadcast signal.

11. The method of claim 10 wherein at least one said signalling event is the absence of the program signal within the active picture portion of the video signal for a predetermined period of time.

12. The method of claim 10 wherein at least one said signalling event is the absence of the vertical interval reference signal for a predetermined period of time.

13. The method of claim 10 wherein at least one said signalling event is the absence of the vertical interval test signal for a predetermined period of time.

14. A system for identifying certain programs broadcast by a broadcasting station, wherein at least one predetermined and readily identifiable signalling event occurs in conjunction with the broadcast of ones of said programs, said system comprising:

means for generating a digital reference feature set from ones of said programs by a transformation of at least one segment of a said program's analog signal content, said segment beginning at a predetermined time with reference to one of said signalling events and being of a predetermined duration, each said reference feature set being associated with a program label code identifying the program from which said reference feature set was derived;

means for storing said reference feature sets and said program label codes;

means for detecting the presence of said signalling events within the broadcast signal of said broadcasting station;

means activated by said detecting means for generating a digital broadcast feature set from ones of said programs broadcast by said broadcasting station, said broadcast feature set being generated by said transformation of at least one segment of the analog broadcast signal content, said segment beginning at a predetermined time with reference to one of said signalling events and being of a predetermined duration;

means for comparing at least one said broadcast feature set with at least one said reference feature set stored in said storage means; and means for deciding when the similarity between a said broadcast feature set and a reference feature set meets a predetermined standard for identification of the broadcast program represented by said broadcast feature set by the program label code associated with said reference feature set.

15. A system as recited in claim 14 further including clock means for generating a time varying code, an instantaneous value of which is associated with each broadcast feature set, said instantaneous value representing the time of broadcast of the program from which said broadcast feature set was derived.

16. The system as recited in claim 14 wherein at least one said signalling event is the presence of a predetermined signal within the broadcast signal of said broadcasting station in conjunction with the broadcast of ones of said programs by said broadcasting station, which predetermined signal is absent from the broadcast signal at at least some other times, said system further comprising:

means for inserting said predetermined signal into said broadcast signal.

17. The system as recited in claim 16 wherein at least one said signalling event is the presence of a predetermined signal within the audio portion of the broadcast signal.

18. The system as recited in claim 17 wherein said predetermined signal is a tone of a predetermined frequency and duration.

19. The system as recited in claim 18 wherein the duration of said tone is less than one half second.

20. The system as recited in claim 16 wherein at least one said signalling event is the presence of a predetermined signal within the video portion of the broadcast signal;

21. The system as recited in claim 20 wherein said predetermined signal is contained within the active picture portion of the video signal.

22. The system as recited in claim 20 wherein said predetermined signal is contained within the vertical blanking interval of the video signal.

23. The system as recited in claim 14 wherein at least one said signalling event is the absence of a predetermined signal within the broadcast signal of said broadcasting station in conjunction with the broadcast of ones of said programs by said broadcasting station, which predetermined signal is present within the broadcast signal at at least some other times, said system further comprising:

means for deleting said predetermined signal from said broadcast signal.

24. The system as recited in claim 23 wherein at least one said signalling event is the absence of the program signal within the active picture portion of the video signal for a predetermined period of time.

25. The system as recited in claim 23 wherein at least one said signalling event is the absence of the vertical interval reference signal for a predetermined period of time.

26. The system as recited in claim 23 wherein at least one said signalling event is the absence of the vertical interval test signal for a predetermined period of time.

27. A system for identifying certain programs transmitted by broadcasting stations, wherein at least one predetermined and readily identifiable signalling event occurs in conjunction with the broadcast of ones of said programs, said system comprising:

a plurality of monitoring units each capable of receiving broadcasts from at least one of said broadcasting stations, each monitoring unit including means for detecting said signalling events, each monitoring unit further including means responsive to said detecting means for generating a digital broadcast feature set from ones of said programs broadcast by said broadcasting station, said broadcast feature set being generated by a transformation of at least one segment of the analog broadcast signal content, said segment beginning at a predetermined time with reference to one of said signalling events and being of a predetermined duration, said monitoring unit further including means for storing said broadcast feature sets;

a central office facility including means for selectively communicating with ones of said monitoring units and for retrieving the information stored in said storage means;

means associated with said central office facility for generating a digital reference feature set from ones of said programs by said transformation of at least one segment of a said program's analog signal content, said segment beginning at said predetermined time with reference to one of said signalling events and being of said predetermined duration, each said reference feature set being associated with a label code identifying the program from which said reference feature set was derived;

means associated with said central office facility for storing ones of said reference feature sets and said program label codes;

means associated with said central office facility for comparing at least one said broadcast feature set with at least one said reference feature set to produce a recognition output when the degree of similarity between a broadcast feature set and a reference feature set meets a predetermined standard, thereby identifying the broadcast program from which said broadcast feature set was derived by the label code associated with said reference feature set.

28. A system as recited in claim 27, each said monitoring unit further including clock means for generating a time varying code, an instantaneous value of which is associated with each broadcast feature set, said instantaneous value representing the time of broadcast of the program from which said broadcast feature set was derived.

29. The system as recited in claim 27 wherein at least one said signalling event is the presence of a predetermined signal within the broadcast signal of said broadcasting station in conjunction with the broadcast of ones of said programs by said broadcasting station, which predetermined signal is absent from the broadcast signal at at least some other times, said system further comprising:

means for inserting said predetermined signal into said broadcast signal.

30. The system as recited in claim 29 wherein at least one said signalling event is the presence of a predetermined signal within the audio portion of the broadcast signal.

31. The system as recited in claim 30 wherein said predetermined signal is a tone of a predetermined frequency and duration.

32. The system as recited in claim 31 wherein the duration of said tone is less than one half second.

33. The system as recited in claim 29 wherein at least one said signalling event is the presence of a predetermined signal within the video portion of the broadcast signal.

34. The system as recited in claim 33 wherein said predetermined signal is contained within the active picture portion of the video signal.

35. The system as recited in claim 33 wherein said predetermined signal is contained within the vertical blanking interval of the video signal.

36. The system as recited in claim 27 wherein at least one said signalling event is the absence of a predetermined signal within the broadcast signal of said broadcasting station in conjunction with the broadcast of ones of said programs by said broadcasting station, which predetermined signal is present within the broadcast signal at at least some other times, said system further comprising:

means for deleting said predetermined signal from said broadcast signal.

37. The system as recited in claim 36 wherein at least one said signalling event is the absence of the program signal within the active picture portion of the video signal for a predetermined period of time.

38. The system as recited in claim 36 wherein at least one said signalling event is the absence of the vertical interval reference signal for a predetermined period of time.

39. The system as recited in claim 36 wherein at least one said signalling event is the absence of the vertical interval test signal for a predetermined period of time.

40. A system for identifying certain programs transmitted by broadcasting stations, wherein at least one predetermined and readily identifiable signalling event occurs in conjunction with the broadcast of ones of said programs, said system comprising:

a plurality of monitoring units each capable of receiving broadcasts from at least one of said broadcasting stations, each said monitoring unit including means for detecting said signalling events, each said monitoring unit further including means responsive to said detecting means for generating a digital broadcast feature set from ones of said programs broadcast by said broadcasting station, said broadcast feature set being generated by a transformation of at least one segment of the analog broadcast signal content, said segment beginning at a predetermined time with reference to one of said signalling events and being of a predetermined duration, each said monitoring unit further incuding means for storing said broadcast feature sets;

a set of digital reference feature sets stored in said storage means in ones of said monitoring units, each said reference feature set having been generated from one of said programs by said transformation of at least one segment of a said program's analog signal content, said segment beginning at said predetermined time with reference to one of said signalling events and being of said predetermined duration, each said reference feature set being associated with a label code identifying the program from which said reference feature set was derived;

means associated with ones of said monitoring units for comparing at least one said broadcast feature set with at least one said reference feature set to produce a recognition output when the degree of similarity between a broadcast feature set and a reference feature set meets a predetermined standard, thereby identifying the broadcast program from which said broadcast feature set was derived by the label code associated with said reference feature set.

41. A system as recited in claim 40, each said monitoring unit further including clock means for generating a time varying code, an instantaneous value of which is associated with each broadcast feature set, said instantaneous value representing the time of broadcast of the program from which said broadcast feature set was derived.

42. The system as recited in claim 40 wherein at least one said signalling event is the presence of a predetermined signal within the broadcast signal of said broadcasting station in conjunction with the broadcast of ones of said programs by said broadcasting station, which predetermined signal is absent from the broadcast signal at at least some other times, said system further comprising:
    means for inserting said predetermined signal into said broadcast signal.

43. The system as recited in claim 42 wherein at least one said signalling event is the presence of a predetermined signal within the audio portion of the broadcast signal.

44. The system as recited in claim 43 wherein said predetermined signal is a tone of a predetermined frequency and duration.

45. The system as recited in claim 44 wherein the duration of said tone is less than one half second.

46. The system as recited in claim 42 wherein at least one said signalling event is the presence of a predetermined signal within the video portion of the broadcast signal;

47. The system as recited in claim 46 wherein said predetermined signal is contained within the active picture portion of the video signal.

48. The system as recited in claim 46 wherein said predetermined signal is contained within the vertical blanking interval of the video signal.

49. The system as recited in claim 40 wherein at least one said signalling event is the absence of a predetermined signal within the broadcast signal of said broadcasting station in conjunction with the broadcast of ones of said programs by said broadcasting station, which predetermined signal is present within the broadcast signal at at least some other times, said system further comprising:
    means for deleting said predetermined signal from said broadcast signal.

50. The system as recited in claim 49 wherein at least one said signalling event is the absence of the program signal within the active picture portion of the video signal for a predetermined period of time.

51. The system as recited in claim 49 wherein at least one said signalling event is the absence of the vertical interval reference signal for a predetermined period of time.

52. The system as recited in claim 49 wherein at least one said signalling event is the absence of the vertical interval test signal for a predetermined period of time.

53. A system for identifying certain programs transmitted by broadcasting stations, wherein at least one predetermined and readily identifiable signalling event occurs in conjunction with the broadcast of ones of said programs, said system comprising:
    a plurality of monitoring units, each capable of receiving the broadcasts of at least one of said broadcasting stations, each monitoring unit including means for recording at least some of the broadcast signal content from said monitored broadcasting station;
    a central office facility including means for retrieving said recorded broadcast signal content from ones of said monitoring units;
    means associated with said central office facility for detecting the presence within said recorded broadcast signal content of said signalling events;
    means associated with said central office facility and responsive to said detecting means for generating a digital broadcast feature set from ones of said programs broadcast by said broadcasting stations and recorded by said monitoring units, said broadcast feature set being generated by a transformation of at least one segment of the analog broadcast signal content, said segment beginning at a predetermined time with reference to one of said signalling events and being of a predetermined duration;
    means associated with said central office facility for generating a digital reference feature set from ones of said certain programs by said transformation of at least one segment of a said program's analog signal content, said segment beginning at said predetermined time with reference to one of said signalling events and being of said predetermined duration, each said reference feature set being associated with a label code identifying the program from which said reference feature set was derived;
    means associated with said central office facility for comparing at least one said broadcast feature set with at least one said reference feature set to produce a recognition output when the degree of similarity between a broadcast feature set and a reference feature set meets a predetermined standard, thereby identifying the broadcast program from which said broadcast feature set was derived by the label code associated with said reference feature set.

54. A system as recited in claim 53, each said monitoring unit further including clock means for generating a time varying code which is recorded on said recording means, an instantaneous value of which time varying code is associated with each broadcast feature set, said instantaneous value representing the time of broadcast of the program from which said broadcast feature set was derived.

55. The system as recited in claim 53 wherein ones of said monitoring units further include means for detecting said signalling event and producing a detection output which is recorded on said recording means, said recorded detection output being detected by said detecting means associated with said central office facility to identify the presence of said signalling events.

56. The system as recited in claim 53 wherein ones of said monitoring units further include means for detecting said signalling event and means responsive to said detecting means for controlling the operation of said recording means.

57. The system as recited in claim 53 wherein at least one said signalling event is the presence of a predetermined signal within the broadcast signal of said broadcasting station in conjunction with the broadcast of ones of said programs by said broadcasting station, which predetermined signal is absent from the broadcast signal at at least some other times, said system further comprising:

means for inserting said predetermined signal into said broadcast signal.

58. The system as recited in claim 57 wherein at least one said signalling event is the presence of a predetermined signal within the audio portion of the broadcast signal.

59. The system as recited in claim 58 wherein said predetermined signal is a tone of a predetermined frequency and duration.

60. The system as recited in claim 59 wherein the duration of said tone is less than one half second.

61. The system as recited in claim 57 wherein at least one said signalling event is the presence of a predetermined signal within the video portion of the broadcast signal.

62. The system as recited in claim 61 wherein said predetermined signal is contained within the active picture portion of the video signal.

63. The system as recited in claim 61 wherein said predetermined signal is contained within the vertical blanking interval of the video signal.

64. The system as recited in claim 53 wherein at least one said signalling event is the absence of a predetermined signal within the broadcast signal of said broadcasting station in conjunction with the broadcast of ones of said programs by said broadcasting station, which predetermined signal is present within the broadcast signal at at least some other times, said system further comprising:

means for deleting said predetermined signal from said broadcast signal.

65. The system as recited in claim 64 wherein at least one said signalling event is the absence of the program signal within the active picture portion of the video signal for a predetermined period of time.

66. The system as recited in claim 64 wherein at least one said signalling event is the absence of the vertical interval reference signal for a predetermined period of time.

67. The system as recited in claim 64 wherein at least one said signalling event is the absence of the vertical interval test signal for a predetermined period of time.

* * * * *

(12) REEXAMINATION CERTIFICATE (4549th)
United States Patent
Lert, Jr. et al.

(10) Number: US 4,230,990 C1
(45) Certificate Issued: Apr. 9, 2002

(54) BROADCAST PROGRAM IDENTIFICATION METHOD AND SYSTEM

(75) Inventors: John G. Lert, Jr., 9549 La Jolla Shores Dr., La Jolla, CA (US) 92037; Peter W. Lert, La Jolla; John F. Cornelius, Cardiff by the Sea, both of CA (US)

(73) Assignee: John G. Lert, Jr., La Jolla, CA (US)

Reexamination Request:
No. 90/004,355, Sep. 5, 1996

Reexamination Certificate for:
Patent No.: 4,230,990
Issued: Oct. 28, 1980
Appl. No.: 06/021,567
Filed: Mar. 16, 1979

(51) Int. Cl.$^7$ ................................................. H04N 7/00
(52) U.S. Cl. .......................... 725/22; 725/19; 725/20; 348/473; 382/218; 455/67.1
(58) Field of Search ................................ 348/907, 1, 2, 348/4; 725/22, 9, 12, 14, 17, 19, 20

(56) References Cited

U.S. PATENT DOCUMENTS 3,745,240 A    7/1973   Morchand et al. ........... 178/5.6

FOREIGN PATENT DOCUMENTS

| CA | 965150 | 3/1975 |
| GB | 1358355 | 7/1974 |
| JP | 48-102604 | 12/1973 |
| JP | 49-18417 | 2/1974 |
| JP | 49-108906 | 10/1974 |

OTHER PUBLICATIONS

Affidavit of Gerald Auerbach, Report of Gerald Auerbach (dated May 15, 1995), and Exhibits 1–6 thereto.

*Primary Examiner*—Christopher Grant

(57) ABSTRACT

An automated method and system for identifying broadcast programs wherein a pattern recognition process is combined with a signalling event which acts as a trigger signal. At least one such trigger, or "cue" signal, occurs with each broadcast of every program which is to be identified; and these signals are used to activate the pattern recognition process which results in program identification. These cue signals can either be artificially inserted into the program signal or they can be events which occur naturally as part of normal broadcast procedures. A segment of each program at a predetermined location with respect to one of these cue signals is sampled and processed according to a feature extraction algorithm to form the program's reference signature, which is stored in computer memory. In the field, the monitoring equipment detects cue signals broadcast by a monitored station and, upon detection, samples the broadcast program signal at the same predetermined location with respect to the detected cue and uses the same feature extraction process to create a broadcast signature of unknown program identity. By comparing broadcast signatures to reference signatures, a computer identifies the broadcasts of programs whose reference signatures have been stored in memory.

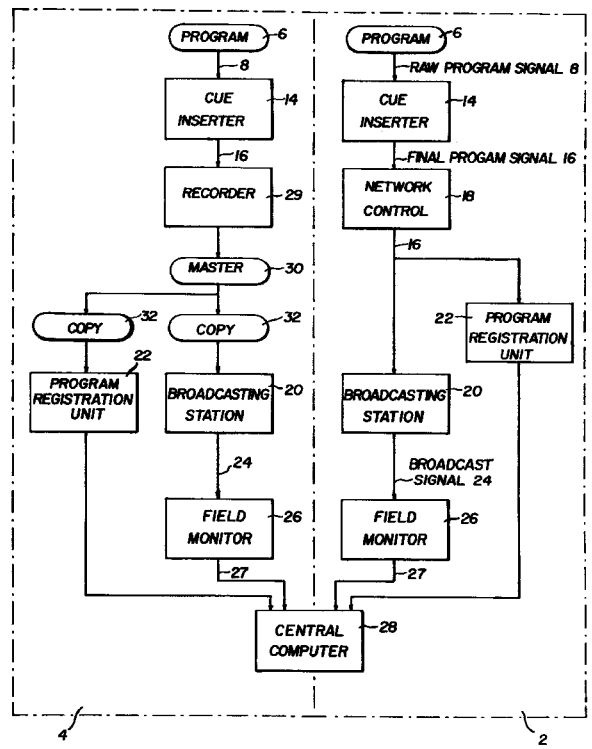

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10–13, 23–26, 36–39, 49–52 and 64–67 is confirmed.

Claims 1–9, 14–22, 27–35, 40–48 and 53–63 are cancelled.

* * * * *